United States Patent Office 2,923,614
Patented Feb. 2, 1960

2,923,614

TRIAZINE DERIVATIVES

Hans Gysin, Basel, and Enrico Knüsli, Riehen, near Basel, Switzerland, assignors to J. R. Geigy A.-G., Basel, Switzerland No Drawing. Application October 24, 1957
Serial No. 692,049

Claims priority, application Switzerland
November 7, 1956

4 Claims. (Cl. 71—2.5)

The present invention is concerned with new triazine derivatives having phytobiological activity and with the use of these compounds for the inhibition of plant growth.

It has surprisingly been found that even in low concentrations 2-bromo-4.6-bis-ethylamino-s-triazine and 2-bromo-4.6-bis-isopropylamino-s-triazine inhibit the growth of and eventually kill plants.

The s-triazine compounds defined above can be produced in a simple manner by reacting cyanuric bromide in the presence of an acid binding agent with 2 mols of the corresponding amine: ethylamine or isopropylamine. As acid binding agent, for example an excess of the amine used in the reaction or an alkali metal carbonate or hydroxide can be used. The reaction can be performed, for example at room temperature or at a moderately raised temperature in the presence or absence of solvents or diluents.

The following examples illustrate the production of the new compounds. Parts are given as parts by weight and the temperatures are in degrees centigrade.

Example 1

31.8 parts of cyanuric bromide are suspended in 100 parts of dioxan and 19 parts of ethylamine in 11 parts of water are added dropwise at room temperature. The whole is stirred for 2 hours at 40–50°, the difficultly soluble reaction product is then filtered off and recrystallised twice from ethyl acetate. A sample of 2-bromo-4.6-bis-ethylamino-s-triazine which is found to be pure on analysis, melts at 219–220°. The melting point however, depends on the quickness of the heating.

A half of the amine can be replaced by the equimolecular amount of sodium or potassium carbonate or sodium or potassium hydroxide.

Example 2

63.6 parts of cyanuric bromide are suspended in 300 parts of ice water and 53 parts of isopropylamine in 13 parts of water are added dropwise at 0–20°. The whole is then stirred for 2 hours at 40–50°, the difficultly soluble reaction product filtered off and recrystallised from ethyl acetate. A sample of 2-bromo-4.6-bis-isopropylamino-s-triazine which is found to be pure on analysis, melts at 202–204°. The melting point however, may depend on the quickness of the heating.

A half of the amine can be replaced by the equimolecular amount of sodium or potassium carbonate or sodium or potassium hydroxide.

The aforementioned 2-bromo-4.6-bis-ethylamino-s-triazine and 2-bromo-4.6-bis-isopropylamino-s-triazine are excellently suited as active ingredients for weed killers, both for the selective repression and destruction of weeds among cultivated plants as well as for the total destruction of and later prevention of undesirable plant growth. By weeds are meant here also for example undesirable growth of a previously planted crop. The compounds defined above are also suitable as active ingredients causing other inhibitive influences on plant growth, in particular defoliation, for example of cotton plants, acceleration of ripeness by premature desiccation, for example the leaves of potato plants, also for the reduction of fruit development, delaying of blossoming, prolongation of the harvesting period and the storing time. Under some circumstances the use of agents having an inhibitive action on plant growth can not only lead to an increase in crop yield by destroying the weeds but can also counteract influences which could stimulate the growth of cultivated plants in an undesirable direction, such as for example high temperature or abundant use of fertilisers. On the other hand, the use of herbicides can also be of interest in the long run for the destruction of obstinate weeds when the selectivity of the agent is not sufficient to exclude the possibility of a reduction in crop yield at the time of application of the agents.

The weed killers according to the present invention can be in the form of solutions, emulsions, suspensions or dusts, depending on the intended use. It must be possible, however, to finely distribute the active ingredient in all forms of application. In particular in the case of total destruction of all plant growth, in premature desiccation as well as defoliation, the action can be strengthened by the use of carriers which are phytotoxic in themselves such as, for example, high boiling mineral oil fractions or chlorinated hydrocarbons; on the other hand generally the selectivity of growth inhibition can be more clearly marked by the use of carriers which are indifferent to plants, for example in selective weed killers.

Examples of solvents which can be used for the production of solutions are, in particular alcohols, for example ethyl or isopropyl alcohol; ketones such as acetone or cyclohexanone; aliphatic hydrocarbons such as kerosene, and cyclic hydrocarbons such as benzene, toluene, xylene, tetrahydronaphthalene, alkylated naphthalenes; in addition, chlorinated hydrocarbons such as tetrachlorethane, ethylene chloride and, finally, also mineral and vegetable oils or mixtures of the above substances.

By aqueous forms are meant chiefly emulsions and dispersions. The substances either as such or in one of the solvents mentioned above are homogenised in water, advantageously by means of wetting and dispersing agents. Examples of cation active emulsifying or dispersing agents are quaternary ammonium compounds; of anion active emulsifying or dispersing agents: soaps, soft soap, aliphatic long chain sulphuric acid monoesters, aliphatic aromatic sulphonic acids, long chain alkoxy acetic acids; of non-ionogenic emulsifying or dispersing agents: condensation products of ethylene oxide alone or with suitable hydroxyl compounds such as fatty alcohols, higher alkyl phenols or partial esters of fatty acids with sorbitane. Also concentrates consisting of active ingredient, emulsifier or disperser and, if necessary, solvent, can be produced which are suitable for dilution with water.

Dusts can be produced chiefly by mixing or milling together the active ingredient and a solid carrier. As such can be named: talcum, diatomaceous earth, kaolin, bentonite, calcium carbonate, boric acid, tricalcium phosphate, also however, sawdust, cork powder, charcoal and other materials of vegetable origin. On the other hand, the substances can be drawn onto the carrier by means of a volatile solvent. By the addition of wetting agents and protective colloids, pulverulent preparations and pastes can be made suspendible in water and used as sprays.

As the active ingredients according to the present invention are both solid as well as liquid and both have about the same herbicidal activity, liquid concentrates for aqueous emulsions as well as powder or paste concentrates for aqueous suspensions having a high concentration of active ingredient can be produced easily.

The various forms of application can be adapted to the intended use in the usual way by the addition of substances which improve the distribution, the adhesive properties, the resistance to rain and, possibly, the penetrating powers. Examples of such substances are fatty acids, resins, wetting agents, glue, casein or alginates. In the same way their biological activity can be increased by the addition of substances having bactericidal, fungicidal or also properties influencing the growth of plants, as well as fertilisers. For complete destruction and hindering of further plant growth for example from 5–20 kg. of 2-bromo-4.6-bis-ethyl-amino-s-triazine per hectare are used and for selective weed killing for example in maize crops, 2–5 kg. perhectare are used. In both cases, the action is of remarkably long duration.

In the following, examples of typical application forms are given as well as results from a greenhouse test and a field test.

Example 3

20 parts of 2-bromo-4.6-bis-ethylamino-s-triazine and 80 parts of talc are milled to the greatest fineness in a ball mill. The mixture obtained can be used as a dust.

Example 4

80 parts of 2-bromo-4.6-bis-ethylamino-s-triazine are mixed with 2–4 parts of a wetting agent, for example a sulphuric acid ester of an alkyl polyglycol ether; 1–3 parts of a protective colloid, for example sulphite waste liquor, and 15 parts of an inert solid carrier such as, e.g. kaolin, bentonite, chalk or kieselguhr and the mixture is then ground finely in a suitable mill. Stirred with water, the wettable powder obtained produces very stable suspensions.

Example 5

30 grains of oats, ryegrass, mustard, sugar beet, cucumber, cotton, vetch and corn were sown in flats which were filled 5 cm. high with screened earth prepared in the following way. 100 mg. of active substance, evenly distributed into 1 g. of talcum powder are incorporated into 1 litre of earth homogeneously. Within 20 days, the seedlings of all test plants with the exception of corn were destroyed when the active ingredient was 2-bromo-4.6-bis-ethylamino-s-triazine.

All the test plants with the exception of corn and cotton were destroyed by applying 2-bromo-4.6-bis-isopropylamino-s-triazine in the above mentioned manner.

Example 6

In a pre-emergence test, radish, lucerne, mustard, corn, peas and carrots were sown in consecutive rows in a field. A wettable powder containing 2-bromo-4.6-bis-isopropylamino-s-triazine was applied in a quantity of 5 kg. of active ingredient per hectare in the form of a 0.5% aqueous suspension. All the test plants germinated normally but 30 days after treating, radish, lucerne, and mustard were killed whilst corn, peas and carrots showed perfectly normal growth.

We claim:

1. A composition for inhibiting the growth of plants, consisting essentially of 2-bromo-4.6-bis-ethylamino-s-triazine in a concentration sufficient to inhibit plant growth, and an agricultural adjuvant as carrier therefor.

2. A composition for inhibiting the growth of plants, consisting essentially of 2-bromo-4.6-bis-isopropylamino-s-triazine in a concentration sufficient to inhibit plant growth, and an agricultural adjuvant as carrier therefor.

3. A method of inhibiting the growth of a plant which comprises bringing 2-bromo-4.6-bis-ethylamino-s-triazine into contact with the plant in an amount sufficient to inhibit plant growth.

4. A method of inhibiting the growth of a plant which comprises bringing 2-bromo-4.6-bis-isopropylamino-s-triazine into contact with the plant in an amount sufficient to inhibit plant growth.

References Cited in the file of this patent

UNITED STATES PATENTS 2,312,692   D'Alelio _____ Mar. 2, 1943

FOREIGN PATENTS 1,135,848   France _____ Dec. 22, 1956

OTHER REFERENCES

Experientia, vol. II, pp. 107–8 (1955).